Oct. 14, 1941.    E. SWEDMAN    2,259,185
REFRIGERATOR CABINET
Filed Oct. 20, 1937    2 Sheets-Sheet 1

Enoch Swedman
INVENTOR.
BY
ATTORNEYS.

Oct. 14, 1941.　　　　E. SWEDMAN　　　2,259,185
REFRIGERATOR CABINET
Filed Oct. 20, 1937　　　2 Sheets-Sheet 2

Enoch Swedman
INVENTOR.
BY
ATTORNEYS.

Patented Oct. 14, 1941

2,259,185

UNITED STATES PATENT OFFICE 2,259,185

REFRIGERATOR CABINET

Enoch Swedman, St. Paul, Minn., assignor to Seeger Refrigerator Company, St. Paul, Minn., a corporation of Minnesota Application October 20, 1937, Serial No. 170,037

3 Claims. (Cl. 220—9)

My invention relates to an improvement in refrigerator cabinets and more particularly in a molding construction for refrigerator cabinets designed to form the connection between sheathings or coverings of the refrigerator body and door.

It has been common practice for a number of years to provide inner and outer metallic coverings for the body and door of a refrigerator and to space the edges of these coverings apart. In order to conceal the space between the inner and outer coverings, a suitable gasket or molding formed of nonmetallic material is used. Because of the fact that the edge of the door and the door opening is much in evidence when the door is in open position, it is extremely important to provide a neat and attractive molding and gasket construction. It has therefore been attempted to obviate the molding screws or attaching means wherever possible, or to cover such attaching means so that they will not mar the appearance of the molding or gasket.

Various attempts have been made to provide gaskets with anchoring means which require no bolts to hold the gaskets in place. This has been accomplished by providing a flange or bead on the gasket to prevent the same from being pulled out of place. It has previously been necessary in most constructions, however, to provide visible screws or bolts for holding the molding or anchoring strip for the gasket in place.

It is an object of the present invention to provide a molding equipped with anchoring means in the form of nails, drive-screws or the like, which anchoring means are not visible when the molding is in place. This is accomplished by embedding in the molding a strip of metal or other relatively rigid material, and to provide on this strip, nails or drive-screws placed at intervals through the length of the strip and projecting from the concealed surface thereof. With this construction, it is possible to attach the molding by merely pounding the outer visible surface thereof to drive the embedded screws or nails into the frame of the refrigerator. When the anchoring means has been driven into place, they are entirely invisible and accordingly do not mar the appearance of the molding.

It is the purpose of my invention to provide a molding strip formed of material such as rubber or any other suitable material, plastic or otherwise. This molding strip has embedded therein a relatively stiff strip of material, such as metal or the like, having nails projecting therefrom at intervals. As the molding entirely incloses the outer portion of this anchoring strip, it cannot be seen when the molding is in place.

It is a further purpose of my invention to provide a strip which may be formed of highly conductive material embedded within a material which is a relatively poor conductor of heat so that the poor conductor contacts the metallic sheathings and the strip of highly conductive material is spaced therefrom to prevent the conduction of heat from one sheathing to another.

It is the purpose of my invention to provide a molding of non-metallic material which incloses or partially incloses a strip which may be formed of metal, either by sliding the metal strip longitudinally into engagement with the non-metallic molding, by casting the strip integrally with the non-metallic molding, or by so designing the metallic strip that a resilient molding formed of rubber or the like may be sprung into engagement therewith.

It is a further object of my invention to provide a combined molding and gasket which is reinforced by relatively stiff material and yet which is sufficiently soft to provide a tight fitting gasket when the refrigerator door is closed.

These and other objects and novel features of my invention will be more clearly and fully set forth in the following specification and claims.

In the drawings forming a part of my specification:

Figure 1:
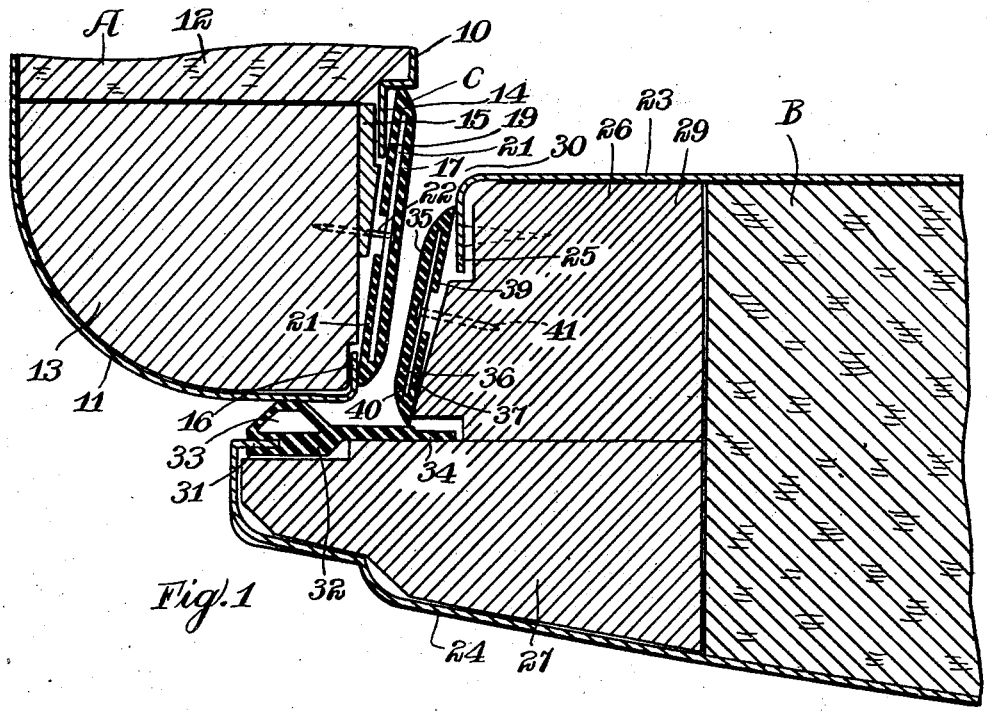
Figure 1 is a cross-sectional view through a portion of a refrigerator cabinet and door, illustrating the molding extending between the inner and outer sheathings of the cabinet and door.

My refrigerator cabinet A is provided with a door B which is hingedly secured to the cabinet A in any desired manner. The cabinet A comprises a pair of inner and outer sheathings 10 and 11, respectively, between which is provided a thickness of insulating material 12. A frame 13 of any desired shape is provided adjacent the edges of the sheathings 10 and 11. The sheathing 10 is provided with an offset edge 14 overlying the strip 15 attached to the frame 13, while the sheathing 11 is provided with an inturned edge 16 overlying a portion of the frame 13. The edges 14 and 16 are spaced a considerable distance apart and are substantially parallel.

The molding C comprises a strip of rubber or resinous or plastic material 17 of sufficient width to overlap the edges 14 and 16. This strip 17 is provided with opposed flanges 19 and 20 which extend inwardly from the opposite side edges of the strip 17 in spaced relation to the outer portion of the strip 17. These flanges 19 and 20 extend inwardly a considerable distance from the edge of the strip, but are centrally spaced apart.

A strip 21 which may be formed of metal or other relatively rigid material, is equipped with a series of nails 22 or other anchoring means, such as drive-screws attached thereto. These nails or anchoring means 22 extend from approximately the transverse center of one side of the strip. This strip 21 is embedded within the molding strip by sliding the strip longitudinally between the flanges 19 and 20, the outer portion of the strip 17, or by any other suitable means, such as molding the strip directly within the molding, or by flexing the flanges 19 and 20 to accommodate this strip. The molding thus formed by the strips 17 and 21 may be attached to the refrigerator by driving the anchoring means 22 into the frame 13 between the edges 14 and 16 of the sheathings 10 and 11. The flanges 19 and 20 contact the edges 14 and 15 and accordingly no metal-to-metal contact is formed between the strip 21 and the sheathing edges 14 and 16.

The door B is provided with an inner sheathing 23 and an outer sheathing 24. The inner sheathing 23 is provided with an inturned marginal flange 25 which overlies a portion of the edge of the frame 26. The outer portion 27 of the frame 26 projects beyond the periphery of the upper portion 29 of this frame 26 to provide a flange projecting beyond the door opening 30 of the cabinet A. The extreme end 31 of the outer sheathing 24 is turned inwardly and is embedded within the gasket strip 32 having a hollow bead 33 to enable the gasket to compress when closed against the body or cabinet A, in order to provide a tight closure between the cabinet and the door. The edge 34 of the gasket 32 extends into a recess in the frame 26.

The molding 35 extends over the inner portion 29 of the frame 26 and connects the inturned flange 25 of the inner sheathing 23 and the gasket 32. This molding 35 is identical with that previously described, but may be of different dimensions. The molding 35 is provided with an outer strip portion 36 and opposed flanges 37 and 39 extending inwardly from the edges of the gasket in spaced relation to the outer strip portion 36. A relatively stiff anchoring strip 40 is positioned between the flanges 37 and 39 and the outer strip portion 36, which strip 40 is identical to the strip 21. Anchoring means 41 are longitudinally spaced projecting centrally from the strip 40 and these anchoring means are driven into the frame 26 so that the molding 35 forms a closure between the inner sheathing 23 and the gasket 32.

Figure 4:
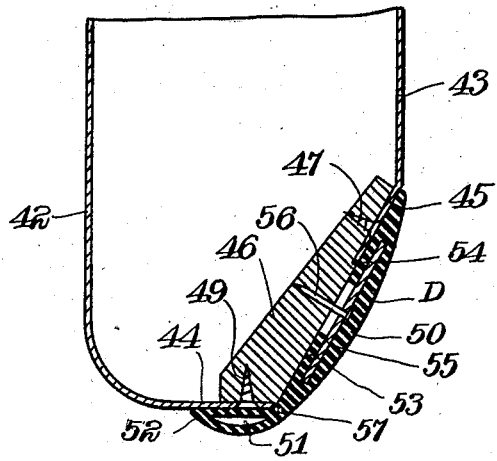
Figure 4 is a cross-sectional view through a portion of a refrigerator cabinet, illustrating a slightly different form of construction of combined gasket and molding used to connect the inner and outer cabinet sheathings.

In Figure 4 of the drawings, I disclose a slightly different form of molding construction in which a gasket is combined with the molding. As may be seen from Figure 4, the refrigerator wall is covered by an outer sheathing 42 and an inner sheathing 43. The edge 44 of the outer sheathing 42 is bent at right angles to the side wall portion of the sheathing 42 to form the front edge of the cabinet surrounding the door opening. The extreme edge 45 of the inner sheathing 43 is bent angularly out toward the edge 44 of the outer sheathing 42. A strip 46 of any suitable material, connects the edges 45 and 44, and anchoring means, such as the screws 47 and 49, or suitable bolts, are provided to hold the edges 45 and 44 in definite relationship. The edges 44 and 45 are spaced a considerable distance apart to prevent the conduction of heat from one sheathing to the other.

Figure 2:
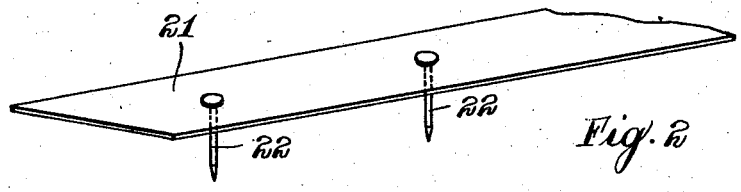
Figure 2 is a perspective view of an anchoring strip, bearing anchoring means which may be embedded within the molding.
Figure 3:
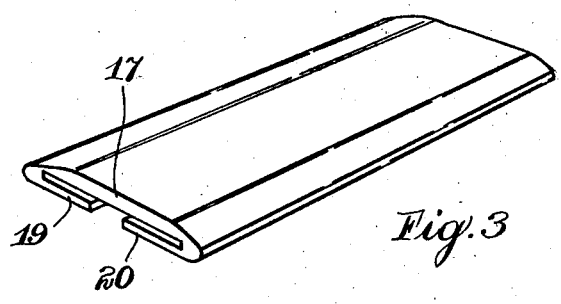
Figure 3 is a perspective view of one type of molding adapted to contain the anchoring strip illustrated in Figure 2 of the drawings.

The molding D comprises an outer arcuated strip portion 50 which overlies the edges 44 and 45. The edge of the strip 50 overlying the edge 44 of the sheathing 42 is hollowed to provide an air space 51 therein, to permit this portion of the gasket to compress when the refrigerator door closes against the same. This edge 52 of the strip 50, is angularly disposed with respect to the remainder of the strip which overlies the frame strip 46. A pair of opposed flanges 53 and 54 are provided in spaced relation to the strip 50 to inclose the edges of the reinforcing strip 55. This strip 55 is identical in form to the strip 21 illustrated in Figure 2, and is equipped with spaced anchoring means 56 which may be in the form of nails, as illustrated, or any other type of anchoring device.

The flanges 53 and 54 space the anchoring strip 55 from the edges 44 and 45 of the sheathings 42 and 43 and from the frame strip 46. At the junction between the angularly disposed end 52 and the body of the strip 50 overlying the anchoring strip 55, I may provide a wire reinforcement 57 which holds the strip closely adjacent the edge 44 of the sheathing 42.

Figure 5:
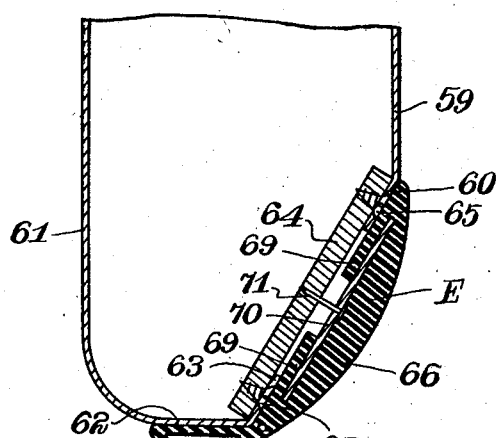
Figure 5 is a sectional view similar to Figure 4, illustrating a slightly different form of construction of refrigerator frame used in conjunction with my molding.

The construction illustrated in Figure 5 of the drawings, is virtually identical to that illustrated in Figure 4. The inner sheathing 59 is provided with an outwardly flared edge 60, while the outer sheathing 61 is bent to form the front surface 62 and has a marginal edge 63 bent into alinement with the edge 60 of the inner flange 59. A strip 64 of any suitable frame material, such as plastic material, resinous material, wood or wood pulp products, is secured between the edges 60 and 63 by screws 65 or by other suitable means. The molding E is identical to the molding D being provided with an outer strip 66 having attached to one end thereof a hollow gasket portion 67. Opposed flanges 69 inclose an anchoring strip 70 provided with anchoring means 71. The molding 66 covers the edges 60 and 63, and overlies a portion of the front surface 62 forming a gasket between this front surface and the door of the refrigerator.

Figure 6:
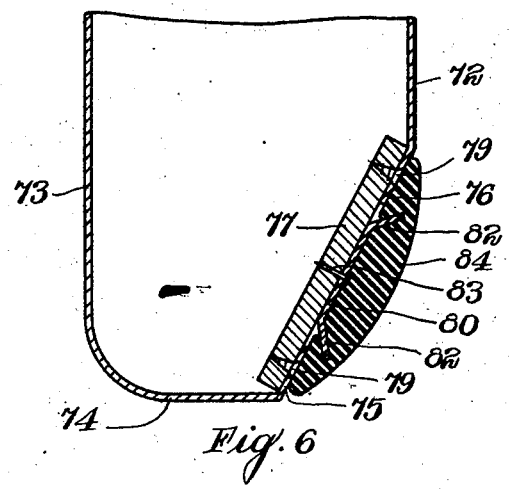
Figure 6 is a cross-sectional view similar to that of Figures 4 and 5, and illustrating a slightly different form of anchoring means used in conjunction with the molding.
Figure 8:
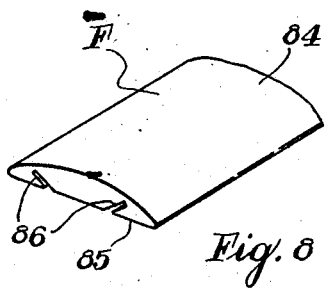
Figure 8 is a perspective view of a section of molding used in conjunction with the anchoring means illustrated in Figure 7.
Figure 7:
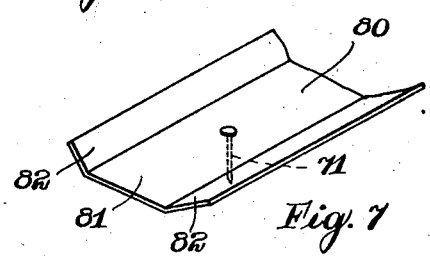
Figure 7 is a perspective view of the anchoring means illustrated in Figure 6 of the drawings.

In Figures 6 and 7 and 8, I illustrate a slightly different form of molding construction in which the molding may be attached to the anchoring means after this anchoring means has been fastened in place to the cabinet frame or to the door frame. In the form illustrated in Figure 6, the cabinet is covered with an inner sheathing 72 and an outer sheathing 73. The outer sheathing 73 is bent to form the front surface 74 and is provided with a marginal edge 75 which is bent into alinement with the edge 76 on the inner sheathing 72. A frame strip 77 connects the edges 76 and 75 being secured thereto by screws 79 or other suitable fastening means.

The anchoring strip 80 may best be illustrated in Figure 7 of the drawings. This strip 80 includes a base portion 81 and angularly disposed marginal flanges 82 which extend outwardly from the frame strip 77 when the anchoring strip 80 is attached thereto by means of the anchoring means 83 forming a part of the strip 80. The molding F is formed as illustrated in Figure 8 of the drawings, having preferably an arcuated outer surface 84 and a flat inner surface 85 and having angularly disposed grooves 86 extending longitudinally through the strip to engage the edge flanges 82. It is obvious that the molding F may be attached to the anchoring strip 80 after the strip 80 has been attached to the frame 77 by inserting one flange 82 in one groove 86 and by flexing the material until the other flange 82 enters the co-operating groove 86 in the molding F.

In accordance with the patent statutes I have described the principles of construction of my refrigerator cabinet and while I have endeavored to set forth the best embodiments thereof, I desire to have it understood that these are only illustrative of a means of carrying out my invention, and that obvious changes may be made within the scope of the following claims without departing from the spirit of my invention.

I claim:

1. A refrigerator cabinet comprising inner and outer sheathings having marginal edges spaced apart, a frame connecting said marginal edges and a molding overlying the connection between said marginal edges and contacting the same, said molding including a strip of non-metallic flexible resilient material and a relatively stiff reinforcing member partially and removably embedded within said molding, said reinforcing member being of a width to overlap said sheathings, said molding leaving a portion of said member exposed throughout its length between said marginal edges on the side thereof adjacent said frame, and anchoring means secured to said strip projecting from said exposed portion of said strip and extending into said frame between said marginal edges, said non-metallic flexible strip being interposed between said metallic strip and said marginal edges.

2. A refrigerator cabinet comprising inner and outer sheathings having marginal edges bent inwardly toward each other in spaced relation, a frame connecting said marginal edges, a non-metallic flexible resilient strip provided with a hollow portion extending substantially the width thereof overlying and contacting the marginal edges of said sheathings and concealing said frame, said non-metallic strip provided with opposed flanges extending inwardly from the edges of said non-metallic strip to the central portion thereof, a flat metallic strip removably secured within said opposed flanges in spaced relation to said sheathings and of a width to overlie said marginal edges, and anchoring means on said strip extending between the said opposed flanges for engagement with the said frame.

3. A refrigerator cabinet comprising an inner and outer spaced sheathing, an outwardly directed marginal flange provided on the edge of said inner sheathing in spaced relation to the edge portion of said outer sheathing, a frame connecting the edge portions of said inner and outer sheathings, a flexible resilient strip provided with inwardly directed flanges overlying and contacting the marginal edges of said sheathings and concealing said frame, a flat metallic strip removably secured within said inwardly directed flanges in spaced relation to said sheathings and of a width sufficient to overlie said inwardly directed flange with a flange of the flexible resilient strip interposed therebetween, a hollow gasket on said resilient strip overlying the edge portion of said outer sheathing, and anchoring means on said metallic strip extending between said inwardly directed flanges and edges and engaging the said frame and clamping said interposed flange to said outwardly directed marginal flange.

ENOCH SWEDMAN.